United States Patent [19]

Imashiro et al.

[11] Patent Number: 5,413,853
[45] Date of Patent: May 9, 1995

[54] MELAMINE RESIN FOAM

[75] Inventors: Yasuo Imashiro; Shun Hasegawa; Takahiko Matsumoto, all of Tokyo, Japan

[73] Assignee: Nisshinbo Industries, Inc., Tokyo, Japan

[21] Appl. No.: 265,815

[22] Filed: Jun. 27, 1994

[30] Foreign Application Priority Data

Jul. 9, 1993 [JP] Japan ................... 5-194115

[51] Int. Cl.$^6$ ............................. C08J 9/224
[52] U.S. Cl. ................. 428/308.4; 428/319.3; 521/57; 521/136; 521/140; 521/187
[58] Field of Search ............... 521/57, 136, 140, 187; 428/308.4, 319.3

[56] References Cited

U.S. PATENT DOCUMENTS

| 4,224,375 | 9/1980 | Veigo et al. | 428/319.3 |
| 4,844,955 | 7/1989 | Graefe et al. | 428/319.3 |
| 4,935,286 | 6/1990 | Witman | 428/308.4 |
| 4,981,081 | 1/1990 | Takahashi et al. | 428/319.3 |

*Primary Examiner*—Morton Foelak
*Attorney, Agent, or Firm*—Adduci, Mastriani, Schaumberg & Schill

[57] ABSTRACT

The present invention provides a melamine resin foam comprising a foam body obtained by foaming a resin composition composed mainly of a melamine-formaldehyde condensate and a blowing agent, and hydrophobic component coated on said foam body.

This melamine resin foam is improved in fragility and water absorbability and in which the drawbacks of the prior art have been alleviated.

6 Claims, No Drawings

MELAMINE RESIN FOAM

BACKGROUND OF THE INVENTION

1. Field of the Invention

The present invention relates to a melamine resin foam. More particularly, the present invention relates to a melamine resin foam which is improved in fragility and water absorbability.

2. Prior Art

As well known, melamine-formaldehyde resins are thermosetting resins obtained by reacting melamine and formaldehyde and are a kind of amino resin, and those having a high molecular weight are in use as tableware or as surface sheets of tables, etc. It is also known that melamine-formaldehyde resin foams show excellent flame retardancy as compared with other organic resin foams.

Melamine-formaldehyde resin foams, however, are very fragile. Particularly when they are highly expanded, the fragility is striking and, In some cases, the excellent water absorbability leads to moisture retention. Use of melamine-formaldehyde foams as a construction material, etc. for their excellent flame retardancy, was investigated, but such use is not yet practiced because of the above drawbacks.

SUMMARY OF THE INVENTION

The object of the present invention is to provide a melamine resin foam which is improved in fragility and water absorbability and in which the drawbacks of the prior art have been alleviated.

According to the present invention there is provided a melamine resin foam comprising a foam body obtained by foaming a resin composition composed mainly of a melamine-formaldehyde condensate and a blowing agent, and hydrophobic component coated on said foam body.

The present inventors made a study with a thinking that when a melamine-formaldehyde resin foam is coated with a hydrophobic component, not only the resulting foam may have improved (lower) water absorbability but also the coating of the hydrophobic component may dissipate the load applied on the foam, resulting in (a) reduction in fracture of foam skeleton and (b) consequent improvement in fragility. As a result, the present invention has been completed.

DETAILED DESCRIPTION OF THE INVENTION

The present invention is hereinafter described in detail.

The melamine resin foam of the present invention is obtained by coating a hydrophobic component on a known melamine-formaldehyde resin foam body obtained by foaming a resin composition composed mainly of a melamine-formaldehyde condensate and a blowing agent. The components used in the present melamine resin foam can therefore be the same as those conventionally used in production of melamine-formaldehyde resins or their foams, except for the hydrophobic component.

For example, the melamine-formaldehyde condensate can be obtained by mixing melamine, formalin and paraformaldehyde and reacting them in the presence of an alkali catalyst with heating. In this case, the mixing ratio of melamine and formaldehyde can be, for example, 1:3 in terms of molar ratio.

The thus obtained melamine-formaldehyde condensate desirably has a viscosity of preferably 1,000–100,000 cP, more preferably 5,000–15,000 cP and a pH of 8–9.

As the blowing agent, there is used, for example, a straight-chain alkyl hydrocarbon. Pentane or hexane is particularly preferable.

In order to obtain a homogeneous foam, the resin composition composed mainly of a melamine-formaldehyde condensate and a blowing agent may contain an emulsifier. Such an emulsifier includes, for example, metal alkylsulfonates and metal alkylarylsulfonates. Of them, sodium dodecylbenzenesulfonate is particularly preferable.

The resin composition may further contain a curing agent in order to cure the foamed resin composition. Such a curing agent includes, for example, acidic curing agents. Of them, formic acid, hydrochloric acid, sulfuric acid and oxalic acid are particularly preferable.

The foam used in the present invention can be obtained by adding as necessary an emulsifier, a curing agent and further a filler, etc. to the resin composition composed mainly of a melamine-formaldehyde condensate and a blowing agent, heat-treating the resulting mixture at a temperature equal to or higher than the boiling point of the blowing agent to give rise to foaming, and curing the resulting foam. Incidentally, the process for production of such a foam is described in, for example, Japanese Patent Application Kokai (Laid-Open) No. 142628/1980 and Japanese Patent Application Kokai (Laid-Open) No. 152848/1981.

The thus obtained foam must have substantially open cells because its skeleton is coated with a hydrophobic component as described later.

The hydrophobic component used in the present invention is not particularly restricted and may be a commercial compound as long as it has hydrophobicity. The hydrophobic component includes, for example, a silicone resin and a chloroprene rubber.

The silicone resin is preferably coated on the skeleton of the foam body in the form of an aqueous emulsion because such application is advantageous in the coating per se, exhaust gas treatment in drying step, drying equipment, solvent recovery, etc. Also, the chloroprene rubber is preferably coated on the skeleton of the foam body in the form of an aqueous latex.

Thus, the melamine resin foam of the present invention can be obtained by forming a foam body of a resin composition composed mainly of a melamine-formaldehyde concentrate and a blowing agent and then coating the surfaces of the skeleton of the foam body with a hydrophobic component.

Coating of the hydrophobic component on the surfaces of the skeleton of the melamine resin foam can be conducted, for example, as follows. That is, the melamine resin foam body is immersed in a solvent, emulsion or latex of the hydrophobic component. The resulting system is subjected to compression 2-3 times or is passed through rollers, whereby the air contained in the foam body is driven out and the solution, emulsion or latex is incorporated into the interior of the foam. Then, the resulting foam body is taken out and the excessive solution, emulsion or latex is removed, for example, by the use of rollers or a press, followed by drying, to obtain a homogeneous foam. At that time, the drying temperature can be selected in the range of room temperature to 150° C., depending upon the kind of the solution, emulsion or latex of the hydrophobic component.

The amount of the hydrophobic component coated on the surfaces of the skeleton of the melamine resin foam can be controlled by (1) the concentration of the hydrophobic component in the solution, emulsion or latex and (2) the pressure of the rollers or press applied to the coated foam.

The present invention is hereinafter described in more detail by way of Examples.

EXAMPLE 1

A commercial melamine resin foam having open cells [Basotect (trade mark), a product of BASF, bulk density=11 kg/m3] was impregnated with a silicone resin emulsion (product number=SE 1980, a product of Shinetsu Silicone). The impregnated foam was subjected to uniform pressing by being passed through rollers. The resulting foam was dried at 150° C. for 3 hours. The final foam had the following properties.

Bulk density: 78 kg/m$^3$
Amount of silicone resin coated: 67 kg/m$^3$
Water absorbability: 25 volume %
Tear strength: 0.10 kg/cm Water absorbability was determined in accordance with DIN 53433 by measuring the weights of a test piece before and after immersion in water and calculating the following formula:

Water absorbability (%) = [weight after immersion (g) − initial weight (g)]/[water density (g/cm$^3$)] × [test piece volume (cm$^3$)] × 100

Tear strength was determined in accordance with JIS K 6252-1933 by measuring the tear force required for cutting a notched test piece from the notch and calculating the following formula:

Tear strength (kg/cm) = [tear force (kg)]/[test piece thickness (cm)]

(These test methods apply also to the following Examples.)

EXAMPLE 2

The same melamine resin foam as used in Example 1 was impregnated with a chloroprene latex (product number=LV-60, a product of Denki Kagaku Kogyo). The impregnated foam was subjected to uniform pressing by being passed through rollers. The resulting foam was dried at 80° C. for 2 hours. The final foam had the following properties.

Bulk density: 115 kg/m$^3$
Amount of chloroprene rubber coated: 104 kg/m$^3$
Water absorbability: 90 volume %
Tear strength: 0.11 kg/cm

EXAMPLE 3

The same melamine resin foam as used in Example 1 was impregnated with a silicone resin emulsion (product number=TSW 831, a product of Toshiba Silicone). The impregnated foam was subjected to uniform pressing by being passed through rollers. The resulting foam was dried at 150° C. for 3 hours. The final foam had the following properties.

Bulk density: 72 kg/m$^3$
Amount of silicone resin coated: 61 kg/m$^3$
Water absorbability: 28 volume %
Tear strength: 0.11 kg/cm

EXAMPLE 4

The same melamine resin foam as used in Example 1 was impregnated with a silicone resin emulsion (product number=SM 7060, a product of Toray-Dow Corning Silicone). The impregnated foam was subjected to uniform pressing by being passed through rollers. The resulting foam was dried at 150° C. for 3 hours. The final foam had the following properties.

Bulk density: 80 kg/m$^3$
Amount of silicone resin coated: 69 kg/m$^3$
Water absorbability: 23 volume %
Tear strength: 0.10 kg/cm

EXAMPLE 5

The same melamine resin foam as used in Example 1 was impregnated with a chloroprene latex (product number=LM 60, a product of Denki Kagaku Kogyo). The impregnated foam was subjected to uniform pressing by being passed through rollers. The resulting foam was dried at 80° C. for 2 hours. The final foam had the following properties.

Bulk density: 120 kg/m$^3$
Amount of chloroprene rubber coated: 119 kg/m$^3$
Water absorbability: 85 volume %
Tear strength: 0.11 kg/cm

EXAMPLE 6

The same melamine resin foam as used in Example 1 was impregnated with a chloroprene latex (product number=LT 50, a product of Denki Kagaku Kogyo). The impregnated foam was subjected to uniform pressing by being passed through rollers. The resulting foam was dried at 80° C. for 2 hours. The final foam had the following properties.

Bulk density: 112 kg/m$^3$
Amount of chloroprene rubber coated: 101 kg/m$^3$
Water absorbability: 87 volume %
Tear strength: 0.13 kg/cm

COMPARATIVE EXAMPLE

The melamine resin foam used in Example 1 had the following properties.

Water absorbability: 95 volume %
Tear strength: 0.05 kg/cm

The melamine resin foam of the present invention is coated with a hydrophobic component at the skeleton surfaces. Therefore, the foam has a low water absorbability and is low in moisture retention.

Conventional melamine foams are fragile inherently and have had problems of skeletal fracture during deformation by compression, etc. and consequent detaching of resin fine particles. In contrast, the melamine resin foam of the present invention, being coated with a hydrophobic component at the skeleton surfaces, can dissipate the load applied (this reduces the skeletal fracture) and, even when fracture occurs, incurs no detaching of rein particle because the foam is coated with a hydrophobic component.

Hence, the melamine resin foam of the present invention can be used as a construction material, etc. for the very high flame retardancy.

What is claimed is:

1. A melamine resin foam comprising a foam body obtained by foaming a resin composition composed mainly of a melamine-formaldehyde condensate and a blowing agent, and hydrophobic component coated on said foam body, wherein said hydrophobic component is a silicone resin or a chloroprene rubber.

2. A melamine resin foam according to claim 1, wherein the foam body is cured after foaming.

3. A melamine resin foam according to claim 1, wherein the foam body has substantially open cells.

4. A melamine resin foam according to claim 3, wherein the surfaces of the skeleton of the foam body is coated with a hydrophobic component.

5. A melamine resin foam according to claim 1, wherein the silicone resin is formed by coating with an aqueous emulsion of a silicone resin.

6. A melamine resin foam according to claim 1, wherein the chloroprene is formed by coating with a chloroprene latex.

* * * * *